(12) United States Patent
Maly et al.

(10) Patent No.: US 7,713,503 B2
(45) Date of Patent: May 11, 2010

(54) SORBENTS AND SORBENT COMPOSITION FOR MERCURY REMOVAL

(75) Inventors: Peter Martin Maly, Lake Forest, CA (US); William Randall Seeker, San Clemente, CA (US); Vitali Victor Lissianski, San Juan Capo, CA (US); Bradley S. Rogers, Leawood, KS (US)

(73) Assignee: General Electric Company, Schenectady, NY (US)

( * ) Notice: Subject to any disclaimer, the term of this patent is extended or adjusted under 35 U.S.C. 154(b) by 399 days.

(21) Appl. No.: 11/531,149

(22) Filed: Sep. 12, 2006

(65) Prior Publication Data

US 2008/0060519 A1 Mar. 13, 2008

(51) Int. Cl.
*B01D 47/00* (2006.01)
(52) U.S. Cl. .................. 423/210; 423/99; 423/594.18; 423/215.5; 588/320; 588/400; 588/404; 588/412; 95/134; 95/58; 95/62; 95/901; 110/345
(58) Field of Classification Search ........................ None
See application file for complete search history.

(56) References Cited

U.S. PATENT DOCUMENTS

| 6,528,030 | B2 | 3/2003 | Madden et al. |
| 7,056,487 | B2 * | 6/2006 | Newby ...................... 423/650 |
| 2003/0143128 | A1 | 7/2003 | Lanier et al. |
| 2004/0134396 | A1 | 7/2004 | Lanier et al. |
| 2004/0247509 | A1 * | 12/2004 | Newby ...................... 423/240 S |
| 2005/0036926 | A1 * | 2/2005 | Lissianski et al. ........... 423/210 |
| 2005/0103243 | A1 | 5/2005 | Lissianski et al. |
| 2005/0129600 | A1 | 6/2005 | Lanier et al. |
| 2005/0147549 | A1 | 7/2005 | Lissianski et al. |
| 2005/0158223 | A1 | 7/2005 | Lissianski et al. |
| 2005/0274307 | A1 | 12/2005 | Lissianski et al. |
| 2006/0021554 | A1 | 2/2006 | Lissianski et al. |
| 2006/0048646 | A1 * | 3/2006 | Olson et al. ................... 95/134 |
| 2006/0120934 | A1 | 6/2006 | Lanier et al. |

OTHER PUBLICATIONS

Zhuang et al (Mercury Control With the Advanced Hybrid Particulate Collecter, Feb. 2002, Technical Progress Report, pp. 1-29).*
Tavoulareas et al., "Multipollutant Emission Control Technology Options for Coal-Fired Power Plants," EPA-600/R-05/034 (Mar. 2005).

* cited by examiner

*Primary Examiner*—Melvin C Mayes
*Assistant Examiner*—Smita Patel
(74) *Attorney, Agent, or Firm*—Armstrong Teasdale LLP

(57) ABSTRACT

A system for removing mercury from combustion gas. The system includes a combustion device, a stack, and a duct system that couples the combustion device to the stack. The system further comprises an injection system that is coupled to the duct system. The injection system injects sorbents including alkali-based sorbents and carbon-based sorbents into the duct system.

12 Claims, 1 Drawing Sheet

SORBENTS AND SORBENT COMPOSITION FOR MERCURY REMOVAL

BACKGROUND OF THE INVENTION

This invention relates generally to methods, systems, and compositions for removing mercury from combustion gas, and, more specifically, to methods, systems, and compositions for removing mercury in flue gas from coal-fired processes.

Volatile metals such as mercury (Hg) are among several air pollutants produced by combustion processes. The U.S. EPA has determined that Hg emissions from power plants must be reduced. Many utilities are actively seeking effective and inexpensive technologies to control Hg emissions.

Presently, there are several technologies available that remove mercury and other substances. For example, injecting activated carbon into the flue is one of the most developed and researched methods for reducing mercury from coal-fired flue gas. Depending on the specific configuration and coal type, the efficiency of Hg removal by activated carbon injection ranges from 40% to 90%. However, the cost of mercury control using activated carbon injection can be very high ranging from $8,000 to $70,000 per lb Hg removed.

Furthermore, due to numerous factors, including the composition of the fuel, the combustion process, the configuration of the power plant, and the number and variety of substances to reduce, no single available control technology can provide effective mercury reduction for all applications. Thus, alternatives for removing mercury and other substances are desired.

BRIEF DESCRIPTION OF THE INVENTION

In one aspect, a method for removing mercury from gas in a controlled system. The method comprises injecting sorbents into the system. The sorbents include carbon-based sorbents and alkali-based sorbents.

In another aspect, a composition suitable for use in a mercury removal system. The composition includes at least about 50% alkali-based sorbents with the remainder including activated carbon suitable for mercury removal.

In another aspect, a system for removing mercury from combustion gas is provided. The system includes a combustion device, a stack, and a duct system that couples the combustion device to the stack. An injection system couples to the duct system and the injection system injects sorbents, including alkali-based sorbents and carbon-based sorbents, into the duct system.

DETAILED DESCRIPTION OF THE INVENTION

Figure 1:
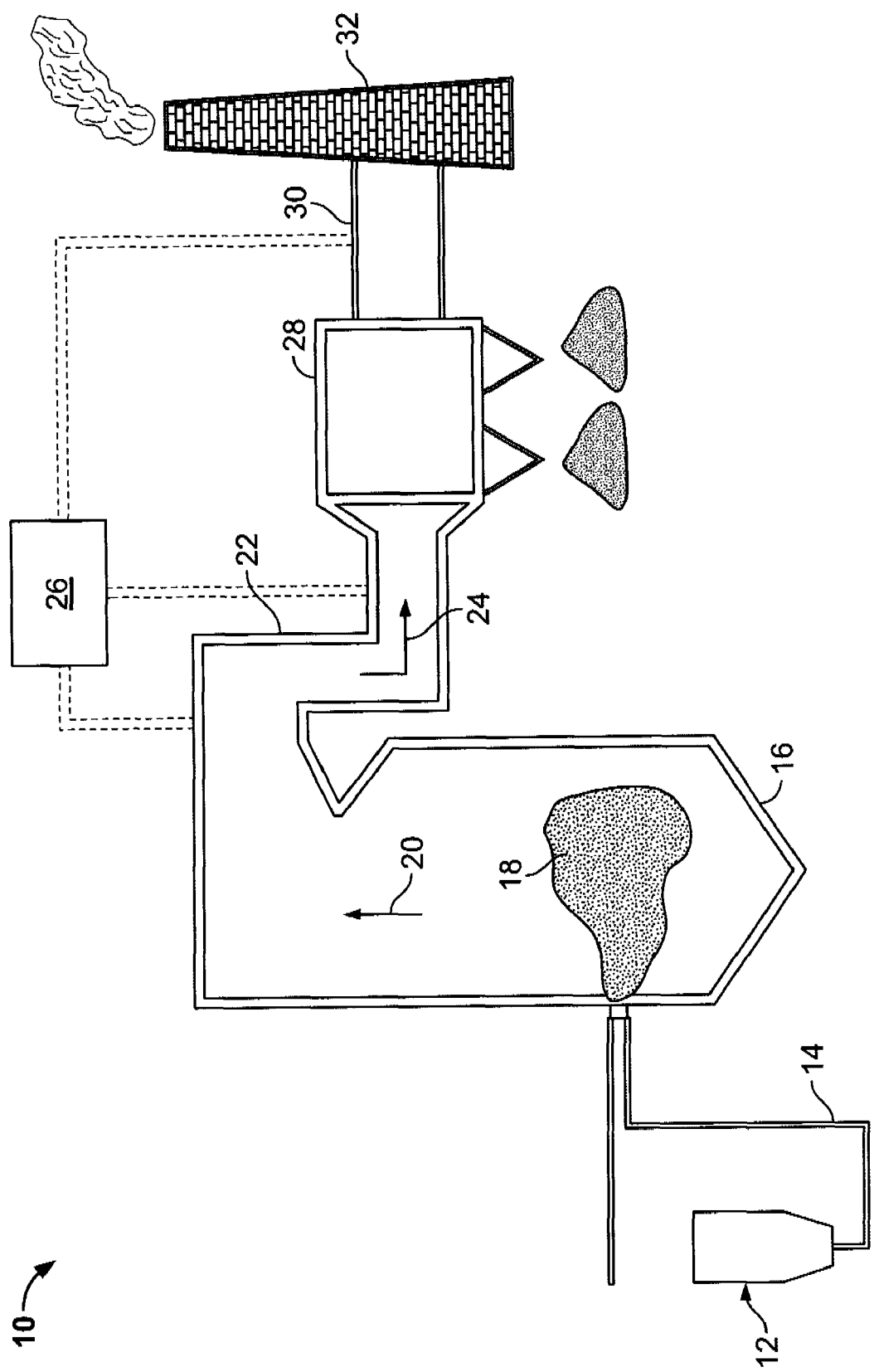
FIG. 1 is a schematic view of an exemplary system according to one embodiment of the present invention.

Before the flow of combustion gas is exhausted into the atmosphere, it is desirable to at least partially remove certain substances resulting from combustion, such as mercury and acidic gases, according to governmental and/or environmental standards and procedures. Aspects of the present invention provide a composition, method, and system for removing and reducing certain substances, such as mercury emissions from a flow of combustion gas produced by a furnace or boiler.

At least one aspect of the invention is described below in reference to its application in connection with and operation of a power plant system for removing mercury from a flow of combustion gas. However, it will be obvious to those skilled in the art and guided by the teachings herein that the compositions, methods, and systems described herein are likewise applicable to any combustion device including, without limitation, furnaces, boilers and heaters, and may be applied to any system consuming fuel, coal, oil or any solid, liquid or gaseous fuel and to any system that controls the flow of gas.

Sorbents are porous and/or high surface area materials that can be used for capturing certain substances in combustion gas. Carbon-based sorbents can be effective in removing mercury from flue gas derived from coal combustion, but the efficiency in reducing Hg can be affected by several factors, such as the composition of the flue gas (which is primarily determined by the composition of the fuel). Data suggest that carbon-based sorbents not only remove mercury, but also remove acidic gases from the flue gas. Species, such as $SO_3$, HCl, and others, may be absorbed by the active sites on the surface of the carbon-based sorbents. Since these sites are no longer available for mercury absorption, it is believed that the carbon-based sorbent's mercury removal efficiency is reduced. This could be significant for mercury removal systems that contain high levels of acidic gas, for example, (a) when the fuel is coal having a high sulfur and HCl content, (b) when $SO_3$ is injected into the system to improve an electrostatic precipitator's performance, or (c) in Selective Catalytic Reduction (SCR) applications which sometimes result in high $SO_2$ to $SO_3$ conversion.

The inventors have surprisingly discovered that a composition including carbon- and alkali-based sorbents effectively reduces the amount of mercury and acidic gases in flue gas. The sorbent composition can be injected into flue gas either upstream or downstream from a pollution control device (discussed below). Alternatively, the carbon-based sorbents and alkali-based sorbents can be separately injected into the flue gas. If the sorbents are separately injected, the alkali-based sorbent can be injected at relatively the same location as the carbon-based sorbent, or upstream from the carbon-based sorbent injection point.

FIG. 1 is a schematic view of a system 10 which may use embodiments of the methods and compositions described herein. According to one aspect, system 10 includes a fuel storage device 12 such as, but not limited to, a bin, bunker, pile, tank or silo in which a fuel supply is stored and collected prior to transport for combustion. The fuel storage device 12 is coupled in flow communication with a fuel transport device 14 which includes, but not limited to, a feeder and piping arrangement used to transport fuel for combustion. Fuel transport device 14 is coupled to a combustion device 16 and channels or provides fuel to combustion device 16.

System 10 includes furnace combustion device 16 that combusts a plurality of fuels, such as coal, oil, or any solid, liquid or gaseous fuels in which a supply of combustion gases are produced. Combustion device 16 includes a combustion zone 18 wherein a fuel-air mixture is combusted causing a high temperature combustion gas 20 stream to be generated.

In operation, system 10 facilitates removing and reducing hazardous and/or toxic compounds, such as mercury emissions from the high temperature combustion gas 20 stream produced during combustion within combustion device 16. Combustion device 16 is coupled to gas outlet duct 22 that is configured to channel combustion exhaust gas 24 from combustion device 16.

More specifically, combustion exhaust gases 24 are contained in gas outlet duct 22, or other suitable connection, which directs the combustion exhaust gas 24 through system 10. Gas outlet duct 22 generally provides flow communication between components of system 10 through a passage in which the combustion exhaust gas 24 is channeled. It is apparent to those skilled in the art and guided by the teachings herein provided that the gas outlet duct 22 may have any suitable configuration, size, or shape to accommodate any supply of combustion gas produced during the combustion process.

Combustion exhaust gas 24 is directed to flow to pollution control device 28. It is apparent to those skilled in the art and guided by the teachings herein provided that pollution control device 28 may have any suitable configuration, size, or shape to accommodate any supply of combustion exhaust gas 24 produced during the combustion process. Pollution control device 28 includes for example, but is not limited to a selective catalyst reduction device, an electrostatic precipitator, a fabric filter (baghouse), a flue gas desulfurization device, a cyclone or multi-cyclone, and/or any other mercury emission, nitrogen oxide emission and particulate emission control system technologies. Furthermore, in alternative aspects, system 10 includes more than one pollution control device 28, which may or may not be the same type or configuration of pollution control device.

According to one aspect, pollution control device 28 discharges fly ash waste and directs the remaining flow to exit duct 30. Exit duct 30 directs flow to a chimney or stack 32. Exit gases are released into the atmosphere through stack 32.

As shown in FIG. 1, at any point or points in system 10 before the flue gas stream leaves stack 32, a sorbent injection system 26 injects a sorbent composition into system 10 (discussed below) for further reducing the emissions mercury and/or other toxic substances emissions. In an alternative aspect, injection system 26 injects the alkali-based sorbents and carbon-based sorbents separately into system 10.

The sorbent composition includes carbon- and alkali-based sorbents. The composition can be in a variety of forms, such as mixture, slurry, or solution. In one embodiment, the sorbent composition is a powdered mixture.

Carbon-based sorbents include, but are not limited to, fly ash and activated carbon. The carbon-based sorbents can be treated to enhance certain properties of the sorbent (e.g., particle size, surface area, pore volume, treatment, coating, and pore size). Furthermore, those skilled in the art and guided by the teachings provided herein know that several factors, such as temperature of the flue, concentration of mercury and other substances in the flue gas, size, weight, and surface area of the sorbent particles, and method of capture (e.g., ESP, fabric filter, cyclone, or scrubber), must be considered before deciding the type(s) of carbon-sorbents to be used.

According to another aspect, the carbon-based sorbent includes activated carbon. Activated carbon (also called activated charcoal) includes carbon material mostly derived from charcoal. The activated carbon should have a high surface area, typically determined by nitrogen adsorption, and include a large amount of microporosity. In some embodiments, the activated carbon is untreated, although for other embodiments the activated carbon is treated to enhance absorbing properties of the material (e.g., particle size, surface area, pore volume, and pore size). For example, additives can be added to the surface of the sorbent or the carbon can be treated with steam to enhance its reactivity. Another treatment process includes impregnating carbon with sulfur, bromine, iodine, or other species.

In one embodiment, the activated carbon is a powdered activated carbon designed to disperse when injected into the flue gas and/or is specifically designed to remove mercury from coal-fired flue gas. In one embodiment, the activated carbon has minimal caking tendencies. More specifically, the activated carbon is a lignite coal-based activated carbon manufactured specifically for the removal of mercury in coal-fired utility flue gas emission streams. Examples of an activated carbon that are suitable for embodiments of the invention are Darco® Hg and Darco® Hg-LH (A registered trademark for NORIT Americas Inc., 2800 West University Ave., Marshall, Tex. 75670).

The alkali-based sorbents include, but are not limited to, trona, hydrated lime, limestone, soda ash, nahcolite, and dolomite. The alkali-based sorbents selected should be effective in removing acidic gases from flue gas of coal combustion or at least in reducing the inhibitory effect that acidic gases have on the adsorption/absorption properties of the carbon-based sorbents. According to another aspect, the alkali-based sorbents include at least one of trona, hydrated lime, limestone, soda ash, nahcolite, dolomite, sodium bicarbonate, and sodium sesquicarbonate.

The alkali-based sorbents include at least one of a sodium-based sorbent, such as nahcolite, trona, soda ash, sodium bicarbonate, and sodium sesquicarbonate. Alternatively, the alkali-based sorbents include at least one of a magnesium-based sorbent.

According to another aspect, the alkali-based sorbent is trona. Trona is the term given to hydrated sodium bicarbonate carbonate ($Na_3HCO_3CO_3.2H_2O$). It is believed to be particularly effective because it has a high surface area and a high reactivity.

According to another aspect, the sorbent composition comprises a majority of carbon-based sorbents. The sorbent composition comprises at least a majority of alkali-based sorbents. More specifically, the sorbent composition comprises from about 95% to about 70% alkali-based sorbents with the remaining amount including carbon-based sorbents.

Those skilled in the art know that many factors may affect the absorption/adsorption capability of the sorbents, such as the temperature and composition of the flue gas, the concentration of Hg and other substances in the exhaust stream, the physical and chemical reactivity characteristics of the other sorbents, the method of capture (e.g., ESP, fabric filter, or dry scrubber), and the time of contact between the flue gas and the sorbent composition.

In one embodiment, injection system 26 may inject the sorbent composition into system 10 via a sorbent composition transport system (not shown), which may include a blower, pipes, hoses, and/or additional duct work for channeling the sorbent composition. Injection system 26 and sorbent composition transport system can further include a programmable logic controller to operate the system and to adjust injection rates.

The walls of the ducts in system 10 include openings (not shown) for a simple wall injector or lances that protrude from the walls into the ducts so the composition can be injected into the flue stream. Furthermore, injection system 26 can include multiple injection sites in order to evenly distribute the composition into the flue gas. It is apparent to those skilled in the art and guided by the teachings herein provided that many types and configurations of sorbent injection systems exist for injecting a sorbent composition into system 10.

Injection system 26 injects the sorbent composition into system 10 so that the composition can effectively distribute and mix with the flue gas allowing the mercury and other toxic substances time to react with the sorbents in the flue gas. In one embodiment, the sorbent is injected upstream from pollution control device 28.

In an alternative embodiment, injection system 26 separately injects the alkali-based sorbents and the carbon-based sorbents into system 10 so that the sorbents effectively distribute and mix with the flue gas allowing the mercury and other toxic substances time to react with the sorbents in the flue gas.

Because mercury removal capacity of the sorbent composition reduces as the temperature of the flue gas increases, typical sorbent compositions are injected at flue gas temperatures no higher than 350° F. However, specially formulated sorbent compositions can be injected at temperatures up to 600° F.

EXAMPLES

Tests to determine the effect of activated carbon, trona, and trona/activated carbon blends on mercury removal were conducted in the 20,000 ACFM slip-stream of a stoker fired unit. The carbon-based sorbents used in the trials were activated carbon (Darco® Hg). The coal fired was a bituminous coal containing approximately 2% sulfur. The following were injected upstream from a fabric filter operating at 300° F. and at a rate of 1-4 lb/MMacf: (a) activated carbon, (b) trona, and (c) mixture of trona/activated carbon containing 5% activated carbon by weight.

The mercury concentration in the flue gas was measured upstream and downstream from the fabric filter using the Ontario Hydro method. The fly ash collected in the fabric filter had a carbon content of approximately 40% and the mercury emissions at the fabric filter inlet were approximately 12 lb/TBtu.

Tests demonstrated that the "natural" capture of mercury on fly ash in the fabric filter (determined as difference between mercury concentration at the inlet and outlet of the fabric filter) was on average 20%. When activate carbon alone was injected into the system, the mercury removal across the fabric filter was up to 24%. The mercury removal across the fabric filter improved to 50% when trona was injected at stoichiometric ratios to S of 0.1 and 0.2. When a mixture of activated carbon/trona was injected at stoichiometric ratios to S of 0.1 and 0.2, mercury removal efficiency increased to 95%. Furthermore, mercury capture generally increases as the rate of injection increased.

Additional tests showed that a blend of hydrated lime and activated carbon provided up to 94% mercury reduction.

Thus, tests demonstrated that a mixture of carbon-based sorbents and alkali-based sorbents was more effective in removing mercury than activated carbon and lime each injected separately.

Exemplary aspects of methods, compositions, and systems for removing mercury are described and/or illustrated herein in detail. The methods, compositions, and systems are not limited to the specific embodiments described herein, but rather, parts of each composition and steps of each method may be utilized independently and separately from other parts and steps described herein.

Furthermore, when introducing elements/components/etc. of the methods, compositions, and systems described and/or illustrated herein, the articles "a", "an", "the" and "said" are intended to mean that there are one or more of the element(s)/component(s)/etc. The terms "comprising", "including" and "having" are intended to be inclusive and mean that there may be additional element(s)/component(s)/etc. other than the listed element(s)/component(s)/etc.

While the invention has been described in terms of various specific embodiments, those skilled in the art will recognize that the invention can be practiced with some modification and still be within the spirit and scope of the claims.

What is claimed is:

1. A method for removing mercury from gas in a controlled system, said method comprising:
    injecting sorbents into the system, wherein the sorbents include carbon-based sorbents and alkali-based sorbents, wherein the carbon-based sorbents are selected to facilitate minimal caking tendencies within the flue, wherein the alkali-based sorbents and the carbon-based sorbents are injected separately, wherein the alkali-based sorbents are injected upstream from the carbon-based sorbents, and wherein the alkali-based sorbents and the carbon-based sorbents are injected as one of a slurry composition and a solution composition.

2. A method for removing mercury from gas in a system in accordance with claim 1 wherein the sorbents comprise at least about 50% alkali-based sorbents.

3. A method for removing mercury from gas in a system in accordance with claim 2 wherein the sorbents comprise from about 70% to about 95% alkali-based sorbents with the remainder including carbon-based sorbents.

4. A method for removing mercury from gas in a system in accordance with claim 3 wherein the carbon-based sorbents include activated carbon and the alkali-based sorbents include sodium-based sorbents.

5. A method for removing mercury from gas in a system in accordance with claim 4 wherein the activated carbon includes a powdered activated carbon and the alkali-based sorbents include trona.

6. A method for removing mercury from gas in a system in accordance with claim 1 wherein said method includes removing the absorbed mercury via a particulate collector.

7. A method for removing mercury from gas in a system in accordance with claim 1 wherein the system is a coal-fired power plant.

8. A composition suitable for use in a mercury removal system, said composition comprising at least about 50% alkali-based sorbents with the remainder including activated carbon suitable for mercury removal, wherein the activated carbon facilitates minimal caking tendencies within the flue, wherein said composition is one of a slurry and a solution.

9. A composition in accordance with claim 8 wherein said composition comprises from about 70% to about 95% alkali-based sorbents with the remainder including activated carbon.

10. A composition in accordance with claim 9 wherein said composition is a mixture.

11. A composition in accordance with claim 10 wherein the activated carbon includes powdered activated carbon and the alkali-based sorbents includes sodium-based sorbents.

12. A composition in accordance with claim 11 wherein the alkali-based sorbent is trona.

\* \* \* \* \*